US006537338B2

(12) United States Patent
Inoue et al.

(10) Patent No.: US 6,537,338 B2
(45) Date of Patent: Mar. 25, 2003

(54) AIR CLEANER UNIT FOR VEHICLE

(75) Inventors: Masahiro Inoue, Saitama (JP); Tadashi Oshima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/821,056

(22) Filed: Mar. 30, 2001

(65) Prior Publication Data

US 2001/0032611 A1 Oct. 25, 2001

(30) Foreign Application Priority Data

Mar. 30, 2000  (JP) ........................................ 2000-095161

(51) Int. Cl.[7] .............................................. B01D 50/00
(52) U.S. Cl. ............... 55/385.3; 55/385.1; 55/DIG. 28; 123/54.4; 123/198 E; 180/219; 180/225
(58) Field of Search ............................ 55/385.1, 385.3, 55/DIG. 28; 123/54.4, 198 E; 180/219, 225

(56) References Cited

U.S. PATENT DOCUMENTS 3,648,837 A * 3/1972 Ogle
4,321,978 A * 3/1982 Tominaga et al. .......... 180/225
4,354,570 A * 10/1982 Tanaka et al. .............. 180/225
RE31,994 E * 10/1985 Tominaga et al. .......... 180/225
5,900,032 A * 5/1999 Wang ........................ 55/385.3
5,921,214 A * 7/1999 Fujita et al. ............ 123/198 E
6,306,190 B1 * 10/2001 Tsuruta et al. ......... 55/DIG. 28

FOREIGN PATENT DOCUMENTS

JP       04255560 A       9/1992

* cited by examiner

Primary Examiner—David A. Simmons
Assistant Examiner—Minh-Chau T. Pham
(74) Attorney, Agent, or Firm—Birch, Stewart, Kolasch & Birch, LLP

(57) ABSTRACT

The object of the present invention is to provide an air cleaner for a vehicle capable of preventing introduced air from directly striking an air cleaner element and of reducing a decrease in intake efficiency to a minimum. The air cleaner unit for a vehicle of the present invention is provided with an air cleaner box 12, an air cleaner element 16 mounted on an upper portion in the air cleaner box, an exhaust port 12a formed at the upper front portion of the air cleaner box 12, an intake port 12b formed on the side of the exhaust port at the front portion of the air cleaner, and an intake duct 15 inserted into the air cleaner box through the intake port, wherein the downstream of the intake duct is linearly mounted toward the lower rear portion in the air cleaner box and an opening in the downstream of the intake duct is arranged below the air cleaner element.

20 Claims, 4 Drawing Sheets

AIR CLEANER UNIT FOR VEHICLE

BACKGROUND OF THE INVENTION

1. Field of the Invention

The present invention relates to an air cleaner unit for a vehicle. More particularly, the present invention relates to an air cleaner which is particularly useful for an all terrain vehicle.

2. Description of Background Art

A conventional air cleaner for a vehicle is disclosed in Japanese Unexamined Patent Publication No. H4-255560. This air cleaner is provided with an air cleaner box mounted on a vehicle body, an air cleaner element mounted forward of the lower portion in the air cleaner box, an exhaust duct mounted forward of the lower portion of the air cleaner box and for supplying air cleaned by the air cleaner element, and an intake duct for introducing air into the air cleaner box.

The intake duct is horizontally inserted into the air cleaner box through the front upper portion of the air cleaner box. A downstream end portion of the intake duct is bent along the rear wall of the air cleaner box and a downstream opening of the intake duct faces toward the bottom portion of the air cleaner box in the back of the air cleaner.

The air introduced through the intake duct is introduced into the air cleaner box and is made to change flow through a passage along a rear wall of the air cleaner box. The air is then directed to the bottom of the air cleaner in the back of the air cleaner element.

This kind of conventional air cleaner is constituted such that the air introduced through the intake duct is introduced to the bottom portion of the air cleaner box. This avoids the air cleaner element from being directly struck by the air entering the air cleaner box.

The flow of the air introduced in the above manner prevents moisture and dust mixed in the introduced air from contacting the air cleaner element. This is advantageous, since the air cleaner is prevented from being clogged.

However, even the above-mentioned conventional air cleaner unit is problematic. Specifically, in the conventional air cleaner described above, the intake duct is horizontally inserted into the air cleaner box through the front upper portion of the air cleaner box and a downstream end portion of the intake duct is bent along the rear wall of the air cleaner box to oppose a rear end opening of the intake duct to the bottom portion of the air cleaner box in the back of the air cleaner. In view of this construction, the path of the intake duct is sharply bent in the narrow region of the air cleaner box. As a result, this presents a problem in that the path of the intake duct is elongated. Furthermore, flow resistance is increased by the bent portion to thereby decrease the intake efficiency of the air cleaner unit.

For example, in general, an all terrain vehicle is provided with a fuel tank in front of the air cleaner box described above. Furthermore, in a vehicle constructed in this manner, the intake duct is sometimes required to be further bent to avoid interference with the fuel tank. This results in further exacerbating the above-mentioned problem.

SUMMARY OF THE INVENTION

In view of the conventional problems described above, the present invention has been made and an object of the present invention is to provide an air cleaner unit capable of preventing the introduced air from directly striking the air cleaner element and capable of reducing a decrease in intake efficiency to a minimum.

In order to accomplish the above-mentioned object, an air cleaner unit for a vehicle, according to a first aspect of the present invention includes: an air cleaner box mounted on a vehicle body; an air cleaner element mounted on the upper portion in the air cleaner box; an exhaust port formed at the upper front portion of the air cleaner box and communicating with the exhaust portion of the air cleaner element; an intake port formed on the side of the exhaust port at the front portion of the air cleaner box; and an intake duct inserted into the air cleaner box through the intake port, wherein the downstream of the intake duct is mounted linearly toward the lower rear portion in the air cleaner box and wherein the opening of the downstream of the intake duct is below the air cleaner element.

An air cleaner unit for a vehicle according to a second aspect of the present invention includes a fuel tank mounted in front of the air cleaner box and a depression on a side thereof along the back and forth direction of the vehicle, wherein the intake duct is extended from the front portion of the air cleaner box to the upper and slanting direction and then along the depression on the fuel tank, whereby the opening of the upstream of the intake duct faces in a forward direction of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
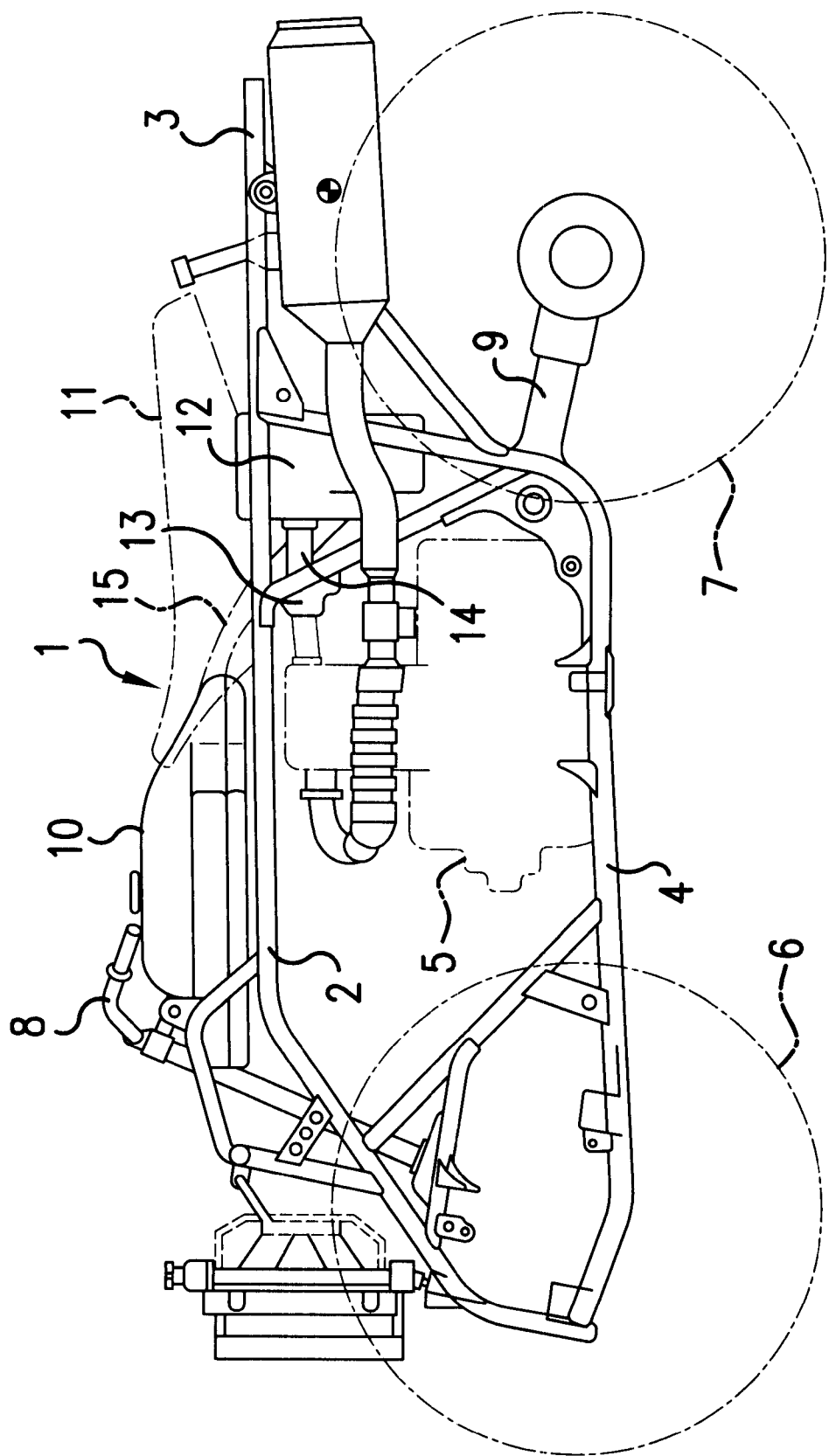
FIG. 1 is a schematic side view showing an all terrain vehicle as a preferred vehicle to which one preferred embodiment of the present invention is applied.

One preferred embodiment of the present invention will now be described in detail with reference to the accompanying drawings. In FIG. 1, a reference numeral 1 designates an all terrain vehicle to which the preferred embodiment of the present invention is applied. This vehicle 1 is provided with: a main pipe 2 extending from the front portion of the vehicle to the upper portion thereof; a seat pipe 3 extending backward from the main pipe 2; an under pipe 4 arranged under the main pipe 2 and approximately parallel thereto; an engine 5 arranged in a space formed by the main pipe 3 and the under pipe 4 and fixed to the under pipe 4; a pair of left and right front wheels 6 mounted on the front end portion of the main pipe 2 and the under pipe 4; a pair of left and right rear wheels 7 mounted on the rear end portion of the under pipe 4; a steering handle 8 for steering the respective front wheels; a power transmission mechanism 9 for transmitting the power of the engine 5 to the respective rear wheels; a fuel tank 10 mounted above and in front of the main pipe 2 and in the back of the steering handle 8; a seat 11 mounted above the seat pipe 3 and in the back of the fuel tank 10; an air cleaner box 12 mounted on the seat pipe 3 under the seat 11 in the space formed by the seat pipe 3, the under pipe 4, and the engine 5; an exhaust duct 14 for supplying cleaned air from the air cleaner box 12 to a carburetor 13 fixed to the engine 5; and an intake duct 15 for introducing the outside air into the air cleaner box.

The air cleaner unit will now be described in detail with specific reference to FIG. 2. An air cleaner element 16 for cleaning air introduced through the intake duct 15 is mounted at the upper portion in the above-mentioned air cleaner box 12.

This air cleaner element 16 is shaped in a cylinder and, in the air cleaner box 12, its axis is arranged along the back and forth direction of the vehicle body. Furthermore, one end of the air cleaner element (rear end portion in the present preferred embodiment) is hermetically closed and the exhaust duct 14 is connected to the other end portion (front end portion of the vehicle body) such that the exhaust duct 14 communicates with the air cleaner element 16.

The exhaust duct 14 is fixed to the front face of the air cleaner box 12 through an exhaust port 12a formed at a position opposed to the exhausting portion of the air cleaner element 16 and is extended approximately horizontally forward of the vehicle body from the exhaust port 12a. The exhaust duct is connected to the carburetor 13 arranged in front of the air cleaner box 12.

Furthermore, an intake port 12b on which intake duct 15 is mounted is formed in front of the air cleaner box 12 and below the side of the exhaust port 12a. The above-mentioned intake duct 15 is inserted into the air cleaner box 12 through the intake port 12b.

Since the downstream end of the intake duct 15 is linearly mounted backward of the bottom portion of the air cleaner box 12, the opening at the downstream end of the intake duct 15 is arranged below the air cleaner element 16.

Figure 3:
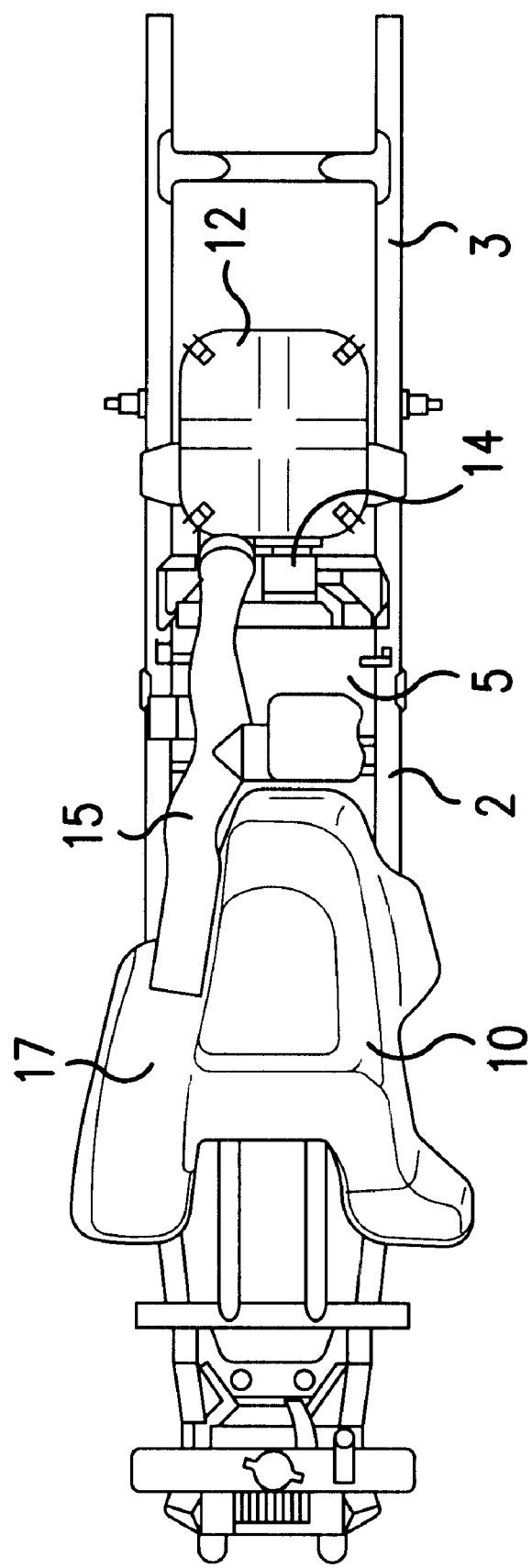
FIG. 3 is a schematic plan view showing an all terrain vehicle as a vehicle to which one preferred embodiment of the present invention is applied.

As shown in FIG. 1, the intake duct 15 extends obliquely forward and upward from the air cleaner box 12. Referring to FIG. 3, the intake duct 15 then extends upward along the side of the fuel tank 10 arranged in front of the air cleaner box 12, and an upstream opening of the intake duct 15 faces toward the front of the vehicle 1.

Figure 2:
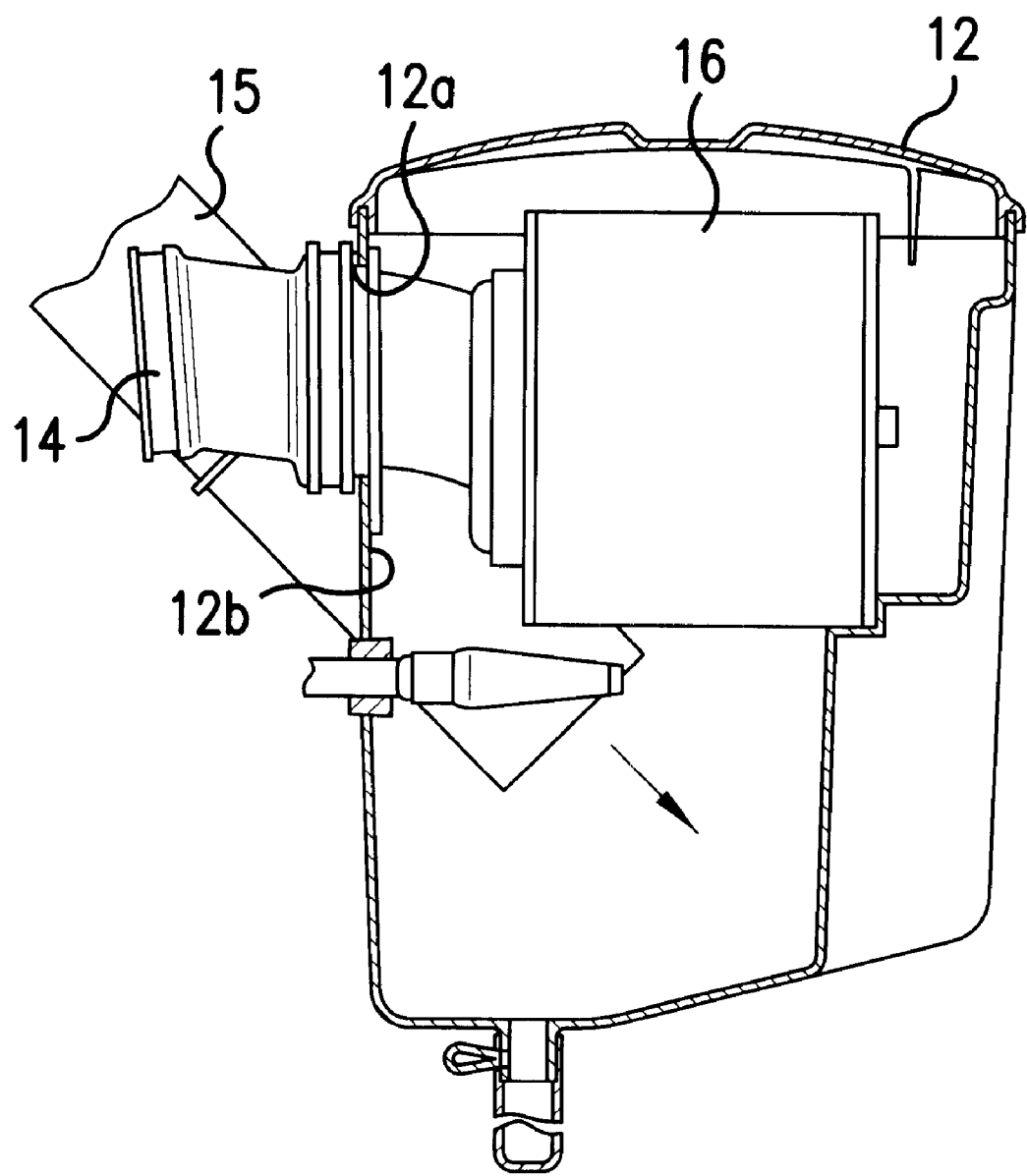
FIG. 2 is a longitudinal cross-sectional view of an air cleaner unit showing one preferred embodiment of the present invention.

In the air cleaner unit for a vehicle in accordance with the preferred embodiment of the present invention, the air introduced into the air cleaner box 12 through the intake duct 15 is introduced to the lower rear portion of the air cleaner box 12, as shown by an arrow in FIG. 2.

Because of the above construction and the fact that the downstream end portion of the intake duct 15 is arranged below the air cleaner element 16, the introduced air is prevented from direct contact with the air cleaner element 16. In this way, even when the introduced air is mixed with moisture, dust and the like, the particles of moisture, dust and the like collide with the bottom wall and the rear wall of the air cleaner box 12 under the air cleaner element 16. Accordingly, the kinetic energy of the particles is absorbed. As a result, the particles of moisture, dust and the like are prevented from being attached to the air cleaner element 16. This prevents the clogging of the air cleaner element 16.

Mounting the intake duct 15 linearly on the air cleaner box 12 can form an air introducing path which is linear in the air cleaner box 12.

Furthermore, since the intake duct 15 extending from the air cleaner box 12 is bent in a large space outside of the air cleaner box 12 and directed forward of vehicle 1, flow resistance in the intake duct 15 is reduced.

In view of the above construction and the fact that the air cleaner element 16 is prevented from being clogged, a decrease in the intake efficiency of the air cleaner unit and therefore a decrease in the output power of the engine 5 is prevented.

Figure 4:
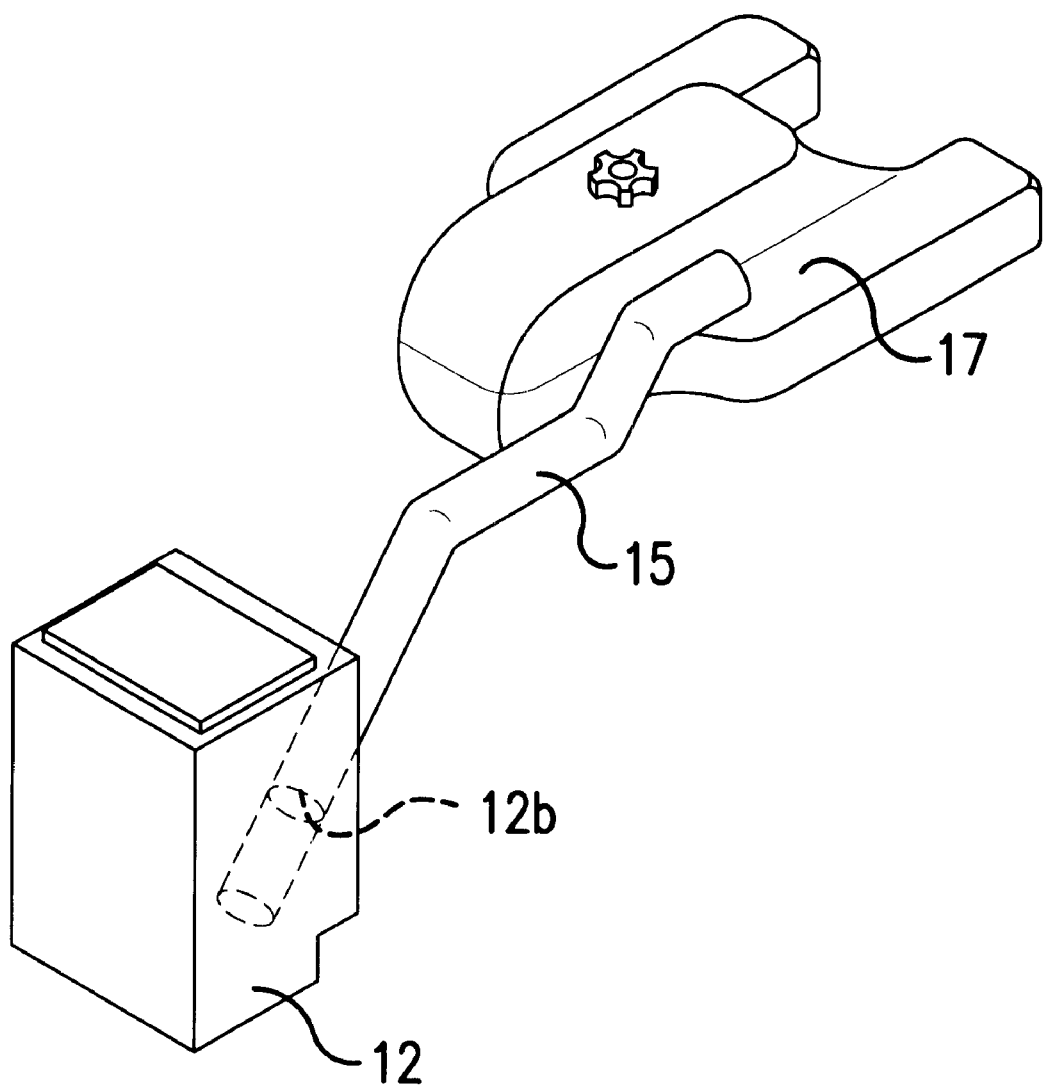
FIG. 4 shows one preferred embodiment of the present invention and is a perspective view showing the positional relationship between an air cleaner unit and a fuel tank.

In addition to the above, in the preferred embodiment of the present invention, as shown in FIGS. 3 and 4, a depression 17 is formed on the side of the fuel tank 10 along the back and forth direction of the vehicle 1 and the intake duct 15 is arranged along the depression 17.

With the above-mentioned construction, a difference in height between the upstream end portion of the intake duct 15 and the portion of the air cleaner box 12 through which the intake duct 15 passes can be reduced. This reduces the amount of bending of the intake duct 15, i.e., the amount of bending of the air introducing path, which results in preventing a decrease in intake efficiency.

Since the present invention is constituted in the above manner, the air introduced into the air cleaner box is introduced under the air cleaner element mounted at the upper portion in the air cleaner box and is made to strike the rear wall in the back of the air cleaner. This prevents the particles of moisture, dust and the like contained in the air from directly striking the air cleaner element and hence the air cleaner element from being clogged.

Mounting the intake duct linearly on the air cleaner box from the upper side to the lower side can reduce the amount of bending of the intake duct and therefore the flow resistance in the intake duct can be reduced.

Therefore, these synergistic effects can prevent a decrease in the intake efficiency of the air cleaner unit and a decrease in the output of the engine.

Furthermore, making a depression on the side of the fuel tank arranged in front of the air cleaner box in the back and forth direction of the vehicle body and arranging the above-mentioned intake duct along the depression can reduce a difference in height of the intake duct in the back and forth direction. As a result, this can reduce the amount of bending, i.e., the amount of bending of the intake path formed by the intake duct. In view of this, a decrease in the intake efficiency of the air cleaner unit and a decrease in the output of the engine can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner unit for a vehicle, comprising:
   an air cleaner box mountable on a vehicle body, said air cleaner box including a front face, said front face facing a forward direction of the vehicle;
   an air cleaner element mounted on an upper portion in the air cleaner box, said air cleaner element including an inlet portion and an exhaust portion;
   an exhaust port formed at an upper portion of said front face of the air cleaner box, said exhaust port being in communication with said exhaust portion of said air cleaner element;
   an intake port formed on a side of said exhaust port at the front face of said air cleaner box; and
   an intake duct inserted in into said air cleaner box in an oblique direction through said intake port, a downstream end of said intake duct is mounted in a linear direction toward a lower rear portion of said air cleaner box, and an opening of said downstream end of said intake duct is disposed below said air cleaner element.

2. The air cleaner unit for a vehicle according to claim 1, wherein the vehicle has a fuel tank mounted in front of a mounting location of said air cleaner, the fuel tank having a depression on a side thereof, said depression extending in a back and front direction of the vehicle, said air cleaner unit further comprising said intake duct being mountable to extend from said front portion of said air cleaner box in an upper oblique direction and then along the depression on the fuel tank, whereby an opening of an upstream end of said intake duct faces in a forward direction of the vehicle.

3. The air cleaner unit for a vehicle according to claim 1, wherein said intake duct forms a linear path extending from said intake port to said opening of said downstream end, said linear path extending obliquely downwardly toward the lower rear portion of the air cleaner box.

4. The air cleaner unit for a vehicle according to claim 1, wherein said opening of said downstream end of said intake duct is spaced from said inlet portion of said air cleaner element, whereby a flow of air through said intake duct passes out of said opening of said downstream end into said air cleaner box and then into said inlet portion of said air cleaner element.

5. The air cleaner unit for a vehicle according to claim 1, wherein said air cleaner element is cylindrical and one axial end thereof is hermetically sealed, the other axial end forming said exhaust portion, and an outer circumferential surface of said air cleaner element forms said inlet portion.

6. The air cleaner unit for a vehicle according to claim 5, wherein an axis of said air cleaner element extends in a generally horizontal direction in a back and front direction of the vehicle.

7. A vehicle, comprising:
  a vehicle body;
  an air cleaner box mounted on said vehicle body, said air cleaner box including a front face, said front face facing a forward direction of the vehicle;
  an air cleaner element mounted on an upper portion in the air cleaner box, said air cleaner element including an inlet portion and an exhaust portion;
  an exhaust port formed at an upper portion of said front face of the air cleaner box, said exhaust port being in communication with said exhaust portion of said air cleaner element;
  an intake port formed on a side of said exhaust port at the front face of said air cleaner box; and
  an intake duct inserted into said air cleaner box in an oblique direction through said intake port, a downstream end of said intake duct is mounted in a linear direction toward a lower rear portion of said air cleaner box, and an opening of said downstream end of said intake duct is disposed below said air cleaner element.

8. The vehicle according to claim 7, further comprising:
  a fuel tank mounted on said vehicle body in front of a mounting location of said air cleaner, said fuel tank having a depression on a side thereof, said depression extending in a back and front direction of the vehicle body;
  said intake duct is mounted to extend from said front portion of said air cleaner box in an upper oblique direction and then along said depression on said fuel tank, whereby an opening of an upstream end of said intake duct faces in a forward direction of the vehicle body.

9. The vehicle according to claim 7, wherein said intake duct forms a linear path extending from said intake port to said opening of said downstream end, said linear path extending obliquely downwardly toward the lower rear portion of the air cleaner box.

10. The vehicle according to claim 7, wherein said opening of said downstream end of said intake duct is spaced from said inlet portion of said air cleaner element, whereby a flow of air through said intake duct passes out of said opening of said downstream end into said air cleaner box and then into said inlet portion of said air cleaner element.

11. The vehicle according to claim 7, wherein said air cleaner element is cylindrical and one axial end thereof is hermetically sealed, the other axial end forming said exhaust portion, and an outer circumferential surface of said air cleaner element forms said inlet portion.

12. The vehicle according to claim 11, wherein an axis of said air cleaner element extends in a generally horizontal direction in a back and front direction of the vehicle.

13. An air cleaner unit for a vehicle, comprising:
  an air cleaner box mountable on a vehicle body;
  an air cleaner element mounted in the air cleaner box, said air cleaner element including an inlet portion and an exhaust portion;
  an exhaust port formed in the air cleaner box, said exhaust port being in communication with said exhaust portion of said air cleaner element;
  an intake port formed on a side of said exhaust port in said air cleaner box; and
  an intake duct inserted into said air cleaner box through said intake port, a downstream end of said intake duct is mounted in a linear direction toward a lower rear portion of said air cleaner box, said intake duct forming a linear path extending from said intake port to said opening of said downstream end, said linear path extending obliquely downwardly toward the lower rear portion of the air cleaner box.

14. The air cleaner unit for a vehicle according to claim 13, wherein the vehicle has a fuel tank mounted in front of a mounting location of said air cleaner, the fuel tank having a depression on a side thereof, said depression extending in a back and front direction of the vehicle, said air cleaner unit further comprising said intake duct being mountable to extend from said front portion of said air cleaner box in an upper oblique direction and then along the depression on the fuel tank, whereby an opening of an upstream end of said intake duct faces in a forward direction of the vehicle.

15. The air cleaner unit for a vehicle according to claim 13, wherein said opening of said downstream end of said intake duct is spaced from said inlet portion of said air cleaner element, whereby a flow of air through said intake duct passes out of said opening of said downstream end into said air cleaner box and then into said inlet portion of said air cleaner element.

16. The air cleaner unit for a vehicle according to claim 13, wherein said air cleaner element is cylindrical and one axial end thereof is hermetically sealed, the other axial end forming said exhaust portion, and an outer circumferential surface of said air cleaner element forms said inlet portion.

17. The air cleaner unit for a vehicle according to claim 16, wherein an axis of said air cleaner element extends in a generally horizontal direction in a back and front direction of the vehicle.

18. The air cleaner unit for a vehicle according to claim 1, wherein said intake duct extends obliquely forward and upward from the air cleaner box along a side of a fuel tank arranged in front of the air cleaner box, an upstream opening of said intake duct facing a front of the vehicle.

19. The vehicle according to claim 7, wherein said intake duct extends obliquely forward and upward from the air cleaner box along a side of a fuel tank arranged in front of the air cleaner box, an upstream opening of said intake duct facing a front of the vehicle.

20. The air cleaner unit for a vehicle according to claim 13, wherein said intake duct extends obliquely forward and upward from the air cleaner box along a side of a fuel tank arranged in front of the air cleaner box, an upstream opening of said intake duct facing a front of the vehicle.

* * * * *